(12) United States Patent
Hirayama et al.

(10) Patent No.: US 11,738,408 B2
(45) Date of Patent: Aug. 29, 2023

(54) MARKING DEVICE, MEDIUM, CONTAINER, AND MARKING METHOD

(71) Applicants: Rie Hirayama, Kanagawa (JP); Kazuhiro Fujita, Tokyo (JP); Keiichi Serizawa, Kanagawa (JP)

(72) Inventors: Rie Hirayama, Kanagawa (JP); Kazuhiro Fujita, Tokyo (JP); Keiichi Serizawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/645,847

(22) Filed: Dec. 23, 2021

(65) Prior Publication Data

US 2022/0266392 A1 Aug. 25, 2022

(30) Foreign Application Priority Data

Feb. 25, 2021 (JP) ................................ 2021-028665

(51) Int. Cl.
*B23K 26/36* (2014.01)
*B23K 26/362* (2014.01)
(Continued)

(52) U.S. Cl.
CPC .......... *B23K 26/362* (2013.01); *B23K 26/082* (2015.10); *B23K 26/0823* (2013.01); *G02B 26/105* (2013.01)

(58) Field of Classification Search
CPC ................ B23K 26/362; B23K 26/082; B23K 26/0823; G02B 26/105
See application file for complete search history.

(56) References Cited

U.S. PATENT DOCUMENTS

| 5,206,496 A | * | 4/1993 | Clement | ................ B41M 5/262 |
| | | | | 219/121.6 |
| 5,632,916 A | * | 5/1997 | Lappalainen | ............ B41M 5/24 |
| | | | | 219/121.85 |

(Continued)

FOREIGN PATENT DOCUMENTS

| JP | S52-74197 | 6/1977 |
| JP | 2015-160235 | 9/2015 |
| WO | WO2021/117899 A1 | 6/2021 |

OTHER PUBLICATIONS

Andrew F. Kurtz, Daniel D. Haas, Nissim Pilossof. Mar. 1, 2017, Laser Beam Shaping in Array-Type Laser Printing Systems from: Laser Beam Shaping Applications CRC Press, https://www.routledgehandbooks.com/doi/10.1201/9781315371306-4 (Year: 2017).*

(Continued)

*Primary Examiner* — Peter Radkowski
(74) *Attorney, Agent, or Firm* — IPUSA, PLLC

(57) ABSTRACT

A marking device, a medium, a container, and a marking method. The marking device includes a first marker including a first optical system having a first focal point, the first marker being configured to concentrate a first light onto a first area of a non-planar portion of a medium to perform marking on the first area, the non-planar portion including a plurality of areas including the first area and a second area, and a second marker including a second optical system having a second focal point. The second marker is configured to concentrate a second light onto the second area to perform the marking on the second area, and the second focal point of the second optical system is different from the first focal point of the first optical system in a direction parallel to a central axis of the first optical system.

15 Claims, 11 Drawing Sheets

(51) Int. Cl.
 *B23K 26/082* (2014.01)
 *B23K 26/08* (2014.01)
 *G02B 26/10* (2006.01)

(56) References Cited

U.S. PATENT DOCUMENTS

| | | | | |
|---|---|---|---|---|
| 5,653,900 | A * | 8/1997 | Clement | B41M 5/262 219/121.81 |
| 5,961,858 | A * | 10/1999 | Britnell | B23K 26/067 219/121.81 |
| 6,057,871 | A * | 5/2000 | Peterson | G06K 1/126 372/75 |
| 6,469,729 | B1 * | 10/2002 | Ryan | B23K 26/04 347/256 |
| 6,756,583 | B2 * | 6/2004 | Yamawaki | H04N 1/053 250/234 |
| 6,796,040 | B2 * | 9/2004 | Ohtomo | H01S 5/02212 362/268 |
| 7,206,014 | B2 * | 4/2007 | Amada | B41J 2/473 347/257 |
| 7,460,145 | B2 * | 12/2008 | Amada | G02B 26/123 347/256 |
| 7,675,001 | B2 * | 3/2010 | Leyvraz | C03C 23/0025 219/121.68 |
| 7,751,458 | B2 * | 7/2010 | Regaard | H01S 5/4012 372/50.12 |
| 8,235,296 | B2 * | 8/2012 | Idaka | G06K 19/00 235/487 |
| 8,319,810 | B2 * | 11/2012 | Vila Closas | B41J 3/4073 347/229 |
| 8,442,673 | B2 * | 5/2013 | Langosch | B65C 9/06 198/470.1 |
| 8,460,566 | B2 * | 6/2013 | Costin, Jr. | B23K 26/364 219/121.68 |
| 9,139,019 | B2 * | 9/2015 | Armbruster | H01S 3/076 |
| 9,358,091 | B2 * | 6/2016 | Gilligan | G03C 1/73 |
| 10,061,200 | B2 * | 8/2018 | Rubin Ben Haim | G03G 15/04072 |
| 10,279,600 | B2 * | 5/2019 | Gertlowski | B41J 2/04581 |
| 10,700,780 | B2 * | 6/2020 | Momtahan | H04B 10/691 |
| 11,201,669 | B2 * | 12/2021 | Momtahan | G02B 26/101 |
| 2002/0014582 | A1 * | 2/2002 | Yamawaki | H04N 1/053 250/234 |
| 2003/0019852 | A1 * | 1/2003 | Kaplan | G06K 1/126 219/121.68 |
| 2004/0141157 | A1 * | 7/2004 | Ramachandran | G02B 17/0621 348/E5.119 |
| 2005/0218126 | A1 * | 10/2005 | Leyvraz | C03C 23/0025 219/121.69 |
| 2006/0262180 | A1 * | 11/2006 | Robbins | G06Q 10/08 347/257 |
| 2006/0262181 | A1 * | 11/2006 | Robbins | B42D 25/41 347/257 |
| 2006/0262182 | A1 * | 11/2006 | Robbins | G09F 3/00 347/257 |
| 2007/0222556 | A1 * | 9/2007 | Robbins | B44C 1/228 340/5.9 |
| 2007/0289935 | A1 * | 12/2007 | Granger | B23K 26/364 53/488 |
| 2008/0011854 | A1 * | 1/2008 | Idaka | G06K 1/121 235/462.01 |
| 2008/0124433 | A1 * | 5/2008 | Yelden | A23L 5/32 426/240 |
| 2009/0322846 | A1 * | 12/2009 | Kashimura | G02B 26/123 347/129 |
| 2010/0152889 | A1 * | 6/2010 | Langosch | B65C 9/40 198/571 |
| 2010/0272961 | A1 * | 10/2010 | Costin, Jr. | B23K 26/082 428/156 |
| 2010/0283825 | A1 * | 11/2010 | Vila Closas | B41J 3/4073 347/225 |
| 2014/0046126 | A1 * | 2/2014 | Gilligan | C12M 1/24 600/35 |
| 2014/0253661 | A1 * | 9/2014 | Armbruster | B23K 26/355 347/225 |
| 2014/0255618 | A1 * | 9/2014 | Gutierrez | G06K 1/128 427/555 |
| 2017/0075226 | A1 * | 3/2017 | Nagler | B41J 2/45 |
| 2017/0225487 | A1 | 8/2017 | Sawamura et al. | |
| 2018/0264845 | A1 * | 9/2018 | Gertlowski | H04N 23/69 |
| 2019/0372667 | A1 * | 12/2019 | Momtahan | G02B 26/0875 |
| 2020/0328810 | A1 * | 10/2020 | Momtahan | G02B 26/101 |

OTHER PUBLICATIONS

European Partial Search Report for EP22156212.7 dated Sep. 8, 2022.
U.S. Appl. No. 17/352,569, filed Jun. 21, 2021, Asato Tamura, et al.
U.S. Appl. No. 17/500,968, filed Oct. 14, 2021, Hideji Miyanishi, et al.
U.S. Appl. No. 17/488,476, filed Sep. 29, 2021, Rie Hirayama, et al.
PCT Application NO. JP2021/035158 filed Sep. 24, 2021, Kazuhiro Akatsu, et al.
PCT Application No. JP2021/032372 filed Sep. 2, 2021, Masaaki Itoh, et al.
PCT Application No. JP2021/030469 filed Aug. 19, 2021, Keiichi Serizawa, et al.

* cited by examiner

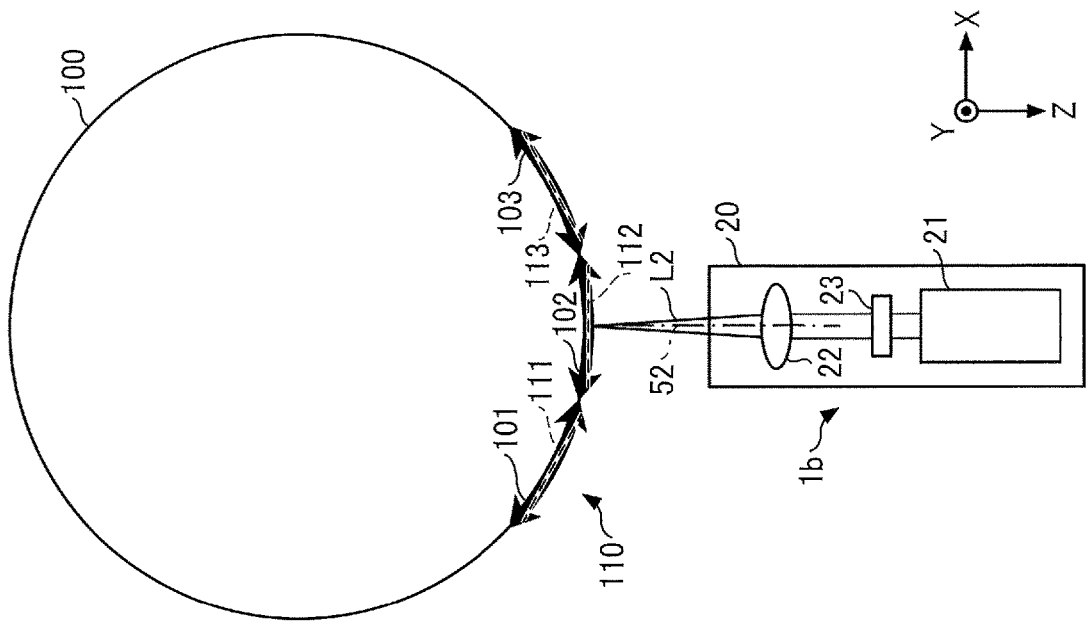
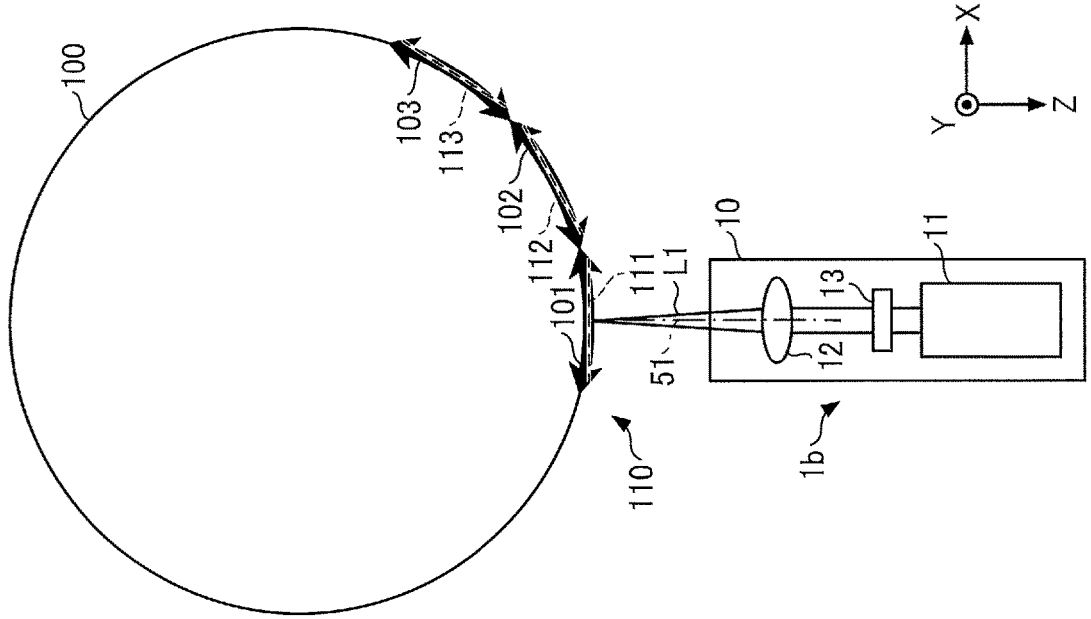

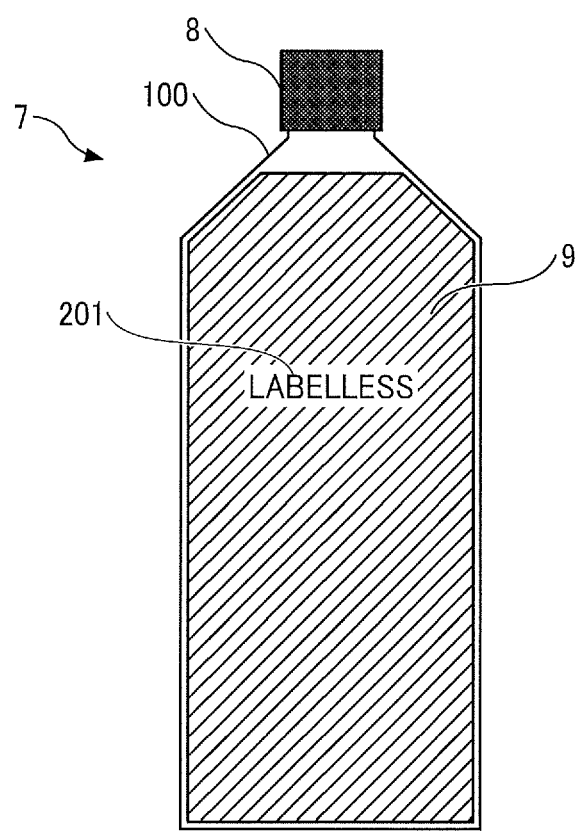

MARKING DEVICE, MEDIUM, CONTAINER, AND MARKING METHOD

CROSS-REFERENCE TO RELATED APPLICATION

This patent application is based on and claims priority pursuant to 35 U.S.C. § 119(a) to Japanese Patent Application No. 2021-028665, filed on Feb. 25, 2021, in the Japan Patent Office, the entire disclosure of which is hereby incorporated by reference herein.

BACKGROUND

Technical Field

Embodiments of the present disclosure relate to a marking device, a medium, a container, and a marking method.

Background Art

In the related art, a medium on which an identification code such as a bar code and a quick response (QR) code (registered trademark), or a design such as a character, a symbol, and a mark are marked is known.

Marking devices that draw a predetermined drawing pattern in a marking area set on an object to be processed are known in the art. Such marking devices are provided with a first marker that performs marking on an object to be processed with a first dot diameter, and a second marker that performs marking on an object to be processed with a second dot diameter narrower than the first dot diameter. The marking devices perform marking upon dividing a drawing pattern in the same area into a first drawing pattern to be drawn by the first marker and a second drawing pattern to be drawn by the second marker.

SUMMARY

Embodiments of the present disclosure described herein provide a marking device, a medium, a container, and a marking method. The marking device includes a first marker including a first optical system having a first focal point, the first marker being configured to concentrate a first light onto a first area of a non-planar portion of a medium to perform marking on the first area, the non-planar portion including a plurality of areas including the first area and a second area, and a second marker including a second optical system having a second focal point. The second marker is configured to concentrate a second light onto the second area to perform the marking on the second area. The second focal point of the second optical system is different from the first focal point of the first optical system in a direction parallel to a central axis of the first optical system.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 8A and FIG. 8B are diagrams each illustrating how a PET bottle is marked by a marking device, according to the third embodiment of the present disclosure.

FIG. 8A is a diagram illustrating how a first area is marked by a marking device, according to the third embodiment of the present disclosure.

FIG. 8B is a diagram illustrating how a second area is marked by a marking device, according to the third embodiment of the present disclosure.

FIG. 12 is a diagram illustrating a container according to an embodiment of the present disclosure.

Figure 1:
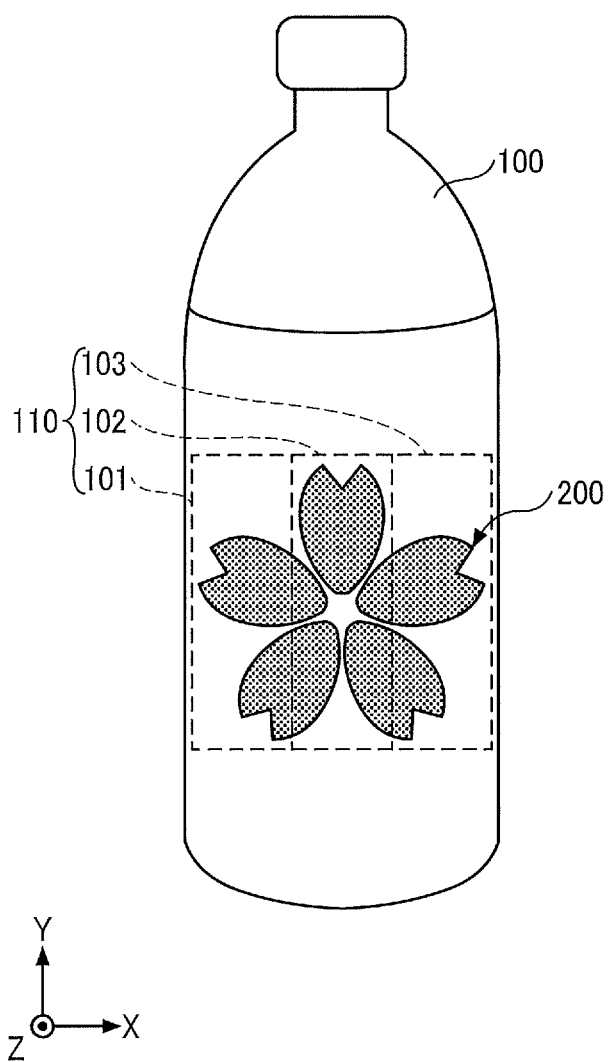
FIG. 1 is a diagram illustrating how a polyethylene terephthalate (PET) bottle is marked, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific integrated circuits (ASICs), field-programmable gate arrays (FPGAs), computers or the like. These terms may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present disclosure are described below with reference to the accompanying drawings. In the drawings, like reference signs denote like elements, and overlapping description may be omitted where appropriate.

An marking device according to embodiments of the present disclosure is described below to implement the technical ideas, and no limitation is indicated to the embodiments of the present disclosure given below. For example, the size, material, and shape of components and the relative positions of the arranged components are given by way of example in the following description, and the scope of the present disclosure is not limited thereto unless particularly specified. For example, the size of these elements and the relative positions of these elements may be exaggerated for purposes of illustration in the drawings.

The marking device according to the present embodiment performs marking on a non-planar portion of a medium. The medium according to the present embodiment may be, for example, a container. The container refers to a member capable of containing a substance such as a solid, liquid, and gas therein. The container according to the present embodiment may be, for example, a polyethylene terephthalate (PET) bottle. The substance that makes up the container may be referred to as a base material in the following description. The base material may include a transparent material such as resin and glass.

Such a transparent material refers to a material having optical transparency to at least visible light. Visible light refers to light that can be visually recognized by human, where the lower bound of wavelength ranges from approximately 360 nanometers (nm) to approximately 400 nm and the upper bound of wavelength ranges from approximately 760 nm to approximately 830 nm.

The materials of resins that are used for the base material may include, for example, polyethylene terephthalate (PET), polyvinyl alcohol (PVA), polybutylene adipate terephtalate (PBAT), polyethylene terephtalate succinate, polyethylene (PE), polypropylene (PP), polyethylene terephtalate (PET), polyvinyl chloride (PVC), polystyrene (PS), polyurethane, epoxy, bio polybutylene succinate (PBS), polylactic acid blend (PBAT), starch-blended polyester resins, polybutylene terephthalate succinate, polylactic acid (PLA), polyhydroxy butyrate/hydroxy hexanoate (PHBH), polyhydroxy alkanoic acids (PHA), Bio PET30, Bio polyamide (PA) 610, 410, and 510, Bio PA1012, 10T, Bio PA11T and MXD10, bio polycarbonate, bio polyurethane, Bio PE, Bio PET100, Bio PA11, and Bio PA1010.

The container may include, for example, a cap and a lid in addition to the main unit that contains a to-be-contained object. In addition to the identification code, characters indicating, for example, the to-be-contained object and the manufacturer, or a figure such as a brand logo and a recycle mark may be formed on the base material.

The container contains a to-be-contained object such as beverages.

The term marking refers to forming a design onto a medium. Such a design includes, for example, an identification code, characters, symbols, and marks. Such an identification code includes, for example, a one-dimensional code such as a bar code or a two-dimensional code such as a quick response (QR) code. What is indicated by marking may be a symbol, a figure, or a character that indicates a container to which an identification code is added, the name or identification number of an object such as a to-be-contained object contained in the container, or the object information such as the manufacturer and the date and time of manufacture.

The term non-planar portion refers to a portion that is not planar. For example, the non-planar portion corresponds to a non-planar portion included in a three-dimensional structure such as a PET bottle formed in, for example, a cylindrical shape or a polygonal angularly cylindrical shape. More specifically, the non-planar portion corresponds to, for example, a side of the PET bottle or an uneven portion formed on the side of the PET bottle.

According to embodiments of the present disclosure, the non-planar portion has a plurality of areas including a first area and a second area, and the marking device has a first marker used to perform marking by concentrating the first light onto the first area through a first optical system, and a second marker used to perform marking by concentrating the second light onto the second area through a second optical system.

The first area and second area that the non-planar portion includes are at different positions in the direction parallel to the central axis of the first optical system. For this reason, when the second focal point of the second optical system is equal to the first focal point of the first optical system in the direction parallel to the central axis of the first optical system, the second light spreads on the second area. Since the first area and second area are not parallel to each other, when the central axis of the second optical system is approximately parallel to the central axis of the first optical system, the central axis of the second optical system is inclined with respect to the second area, so that the second light spreads on the second area.

As a result, the quality of marking on the second area may deteriorate. The focal point refers to a position where light is concentrated by an optical system. For example, when a laser beam is concentrated, the beam-waist position according to the present embodiment serves as the focal point. However, the focal point is not limited to the beam-waist position, and may be a so-called defocus position shifted from the beam-waist position.

In the present embodiment, in the direction parallel to the central axis of the first optical system, the second focal point by the second optical system is different from the first focal point by the first optical system. Due to such a configuration, the first marker can concentrate the first light onto the first area, and the second marker can concentrate the second light onto the second area. As a result, marking can be performed on both the first area and second area at high quality.

In an alternative embodiment of the present disclosure, the central axis of the first optical system is perpendicular to a plane intersecting with the first area, and the central axis of the second optical system is perpendicular to a plane tangent to the second area and is not parallel to the central axis of the first optical system. Accordingly, the first optical system can concentrate the first light such that the central axis thereof will be orthogonal to the plane of the first area, and the second optical system can concentrate the second light such that the central axis thereof will be orthogonal to the plane of the second area. As a result, marking can be performed on both the first area and second area at high quality. The term non-parallel may be used to indicate that an object is not parallel to something. When it is described that an object is orthogonal to something, it does not require strict orthogonality, and allows deviation from strict orthogonality to such an extent that is recognized as an error in the related art. This is applicable to the following description in which the term orthogonal is used.

In an alternative embodiment of the present disclosure, the medium is conveyed in a predetermined conveyance direction, and the second marker performs marking on the second area after the first marker performs marking on the first area and changes the orientation of the non-planar portion. Accordingly, the first optical system can concentrate the first light such that the central axis thereof will be orthogonal to the plane of the first area, and the second optical system can concentrate the second light such that the central axis thereof will be orthogonal to the plane of the second area. As a result, marking can be performed on both the first area and second area at high quality.

Some embodiments of the present disclosure are described below in detail with reference to the accompanying drawings.

In the drawings referred to in the following description, the directions may be indicated by an X-axis, a Y-axis, and a Z-axis. The direction that is indicated by an arrow in the X-direction is referred to as a +X-direction, and the direction opposite to the +X-direction is referred to as a −X-direction. Moreover, the direction that is indicated by an arrow in the Y-direction is referred to as a +Y-direction, and the direction opposite to the +Y-direction is referred to as a −Y-direction. Further, the direction that is indicated by an arrow in the Z-direction is referred to as a +Z-direction, and the direction opposite to the +Z-direction is referred to as a −Z-direction. However, no limitation is indicated to the orientation of the marking device in use, and the orientation of the marking device may be in any desired direction.

FIG. 1 is a diagram illustrating how the PET bottle 100 is marked, according to the present embodiment.

As illustrated in FIG. 1, the PET bottle 100 according to the present embodiment is a cylindrical member, and serves as a medium. The PET bottle 100 has a side on which a pattern 200 is marked.

The Y-axis in FIG. 1 indicates the direction parallel to the cylindrical axis of the PET bottle 100, and the X-axis indicates the direction approximately orthogonal to the Y-axis. The Z-axis in FIG. 1 indicates the direction approximately orthogonal to both the X-axis and the Y-axis. The directions that the X-axis, the Y-axis, and the Z-axis indicate are applicable to the drawings referred to in the following description.

The side of the PET bottle 100 is curved and has curvature around the cylindrical axis. The PET bottle 100 has a curved plane 110 on the side. The curved plane 110 according to the present embodiment serves as a non-planar portion, and includes the first area 101, the second area 102, and the third area 103.

The first area 101, the second area 102, and the third area 103 are examples of a plurality of areas arranged around the cylindrical axis on the side surface portion of the PET bottle 100, and the multiple areas do not overlap each other. In other words, the first area 101 includes a non-overlapping area that does not overlap with the second area 102. However, no limitation is indicated thereby, and at least some of the multiple areas may overlap with each other.

The pattern 200 according to the present embodiment serves as a design. In the present embodiment described with reference to FIG. 1, the pattern 200 is a pattern indicating petals. The pattern 200 is marked as the base material of the PET bottle 100 is modified by, for example, evaporation, melting, crystallization, and foaming due to the optical energy of the laser beam concentrated onto each of the first area 101, the second area 102, and the third area 103. The marking device according to the present embodiment performs such marking.

First Embodiment

Figure 2:
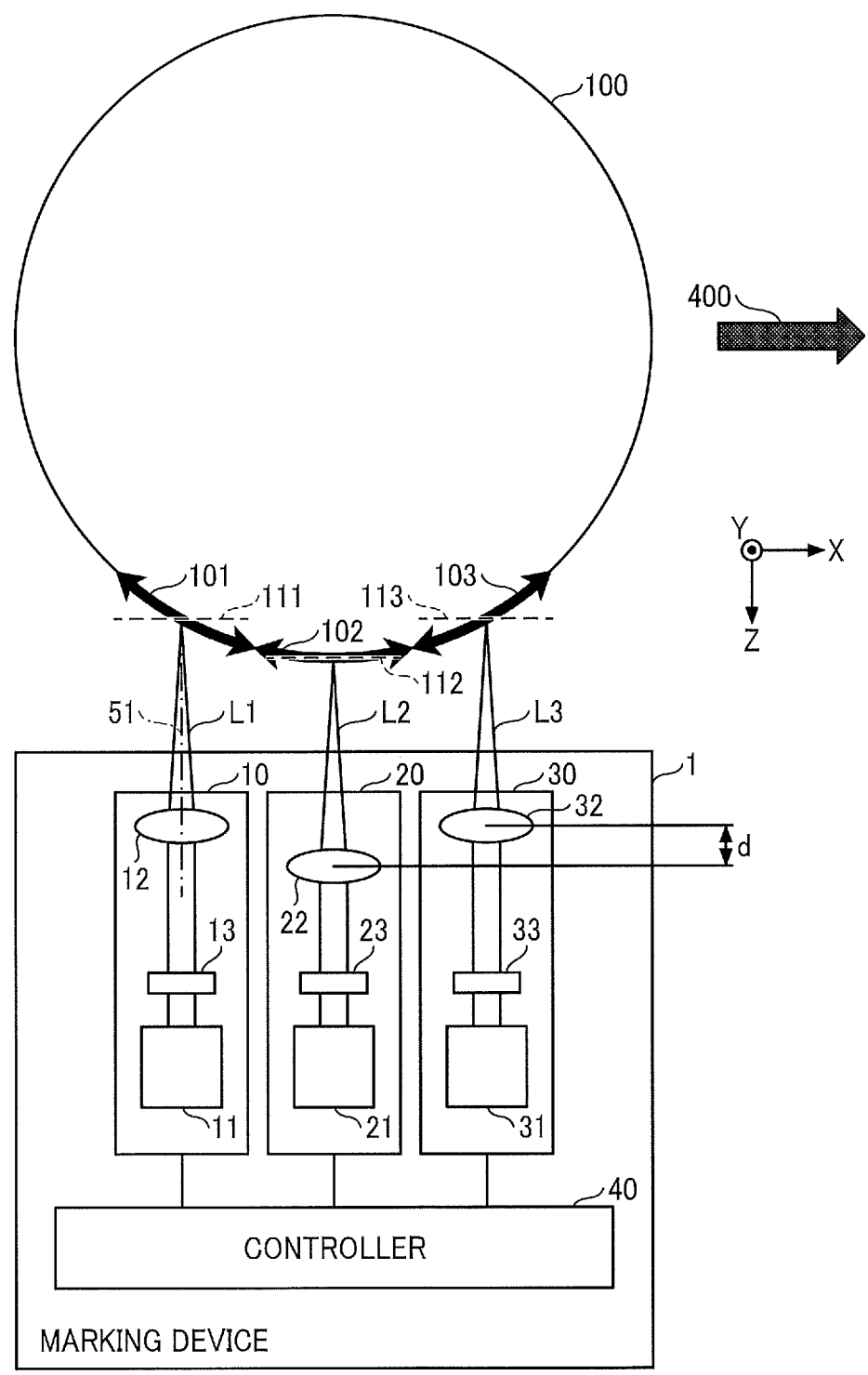
FIG. 2 is a diagram illustrating a configuration of a marking device according to a first embodiment of the present disclosure.

FIG. 2 is a diagram illustrating a configuration of the marking device 1 according to the first embodiment.

FIG. 2 illustrates the PET bottle 100 and the marking device 1 viewed in the +Y-direction. The marking device 1 is illustrated in perspective view such that the inner structure or configuration can be seen through.

As illustrated in FIG. 2, the marking device 1 includes a first marker 10, a second marker 20, a third marker 30, and a controller 40. The marking device 1 according to the present embodiment uses the first marker 10, the second marker 20, and third marker 30 to perform marking on the first area 101, the second area 102, and the third area 103, respectively, based on the received image data.

The first marker 10 includes a first laser beam source 11, a first condenser lens 12, and a first galvano mirror 13. The first marker 10 according to the present embodiment uses the first galvano mirror 13 to perform raster scanning on the first laser beam L1 emitted from the first laser beam source 11 in the direction parallel to the Y-axis, and concentrates the scanned first laser beam L1 onto the first area 101 by the first condenser lens 12. By so doing, the first area 101 is marked. The first condenser lens 12 according to the present embodiment serves as a first optical system, and the first laser beam L1 according to the present embodiment serves as a first light.

The second marker 20 according to the present embodiment includes a second laser beam source 21, a second condenser lens 22, and a second galvano mirror 23. The second marker 20 according to the present embodiment uses the second galvano mirror 23 to perform raster scanning on the second laser beam L2 emitted from the second laser beam source 21 in the direction parallel to the Y-axis, and concentrates the scanned second laser beam L2 onto the second area 102 by the second condenser lens 22. By so doing, the second area 102 is marked. The second condenser lens 22 according to the present embodiment serves as a second optical system, and the second laser beam L2 according to the present embodiment serves as a second light.

The third marker 30 according to the present embodiment includes a third laser beam source 31, a third condenser lens 32, and a third galvano mirror 33. The third marker 30 according to the present embodiment uses the third galvano mirror 33 to perform raster scanning on the third laser beam L3 emitted from the third laser beam source 31 in the direction parallel to the Y-axis, and concentrates the scanned third laser beam L3 onto the third area 103 by the third condenser lens 32. By so doing, the third area 103 is marked.

The first marker 10, the second marker 20, and the third marker 30 can perform marking the curved plane 110 in parallel.

As the PET bottle 100 is conveyed in the conveyance direction 400 along the X-axis, the relative positions of the PET bottle 100 and the focal point of the laser beams emitted from each marker along the X-axis change. Accordingly, marking can be performed on the entirety of each one of the first area 101, the second area 102, and the third area 103.

All of the first laser beam source 11, the second laser beam source 21, and the third laser beam source 31 is a fiber laser, and emits a short-pulse laser beam such as a picosecond or nanosecond laser beam. The fiber laser is a laser beam source that uses an optical fiber doped with a rare-earth element as a laser medium.

However, the multiple laser beam sources are not limited to fiber lasers, and various kinds of laser beam sources may be used. The laser beams that are emitted from the multiple laser beam sources may be pulsed light or continuous wave (CW). However, from the viewpoint of, for example, peak energy, a laser beam that can oscillate a pulse in picosecond to nanosecond is preferable.

The solid-state laser may be, for example, a yttrium aluminum garnet (YAG) laser and a titanium sapphire laser. The gas laser may be, for example, an argon laser, a helium-neon laser, and a carbon dioxide laser. Preferably, the size of a semiconductor laser is small. The fiber laser is a more preferable light source than the other kinds of laser beam sources in view of its high peak energy and a high potential of miniaturization.

Different types of laser beam source may be used for each of the first laser beam source 11, the second laser beam source 21, and the third laser beam source 31.

All of the first condenser lens 12, the second condenser lens 22, and the third condenser lens 32 is a refractive single lens having the same shape, and is a fθ lens with the same focal length. The fθ lens has a function to concentrate a laser beam while performing equal-speed scanning. The fθ lens may be made of a material such as glass or resin. However, in the present embodiment, glass is more preferable because the optical energy of laser beam is large.

The first condenser lens 12, the second condenser lens 22, and the third condenser lens 32 are not limited to those described above as long as an optical system that can concentrate light is adopted. For example, a diffractive lens and a mirror that has a function to concentrate light may be adopted, and a plurality of types of lenses or mirrors can be combined. The condenser lenses may have different shapes or different optical characteristics such as focal lengths.

All of the first galvano mirror 13, the second galvano mirror 23, and the third galvano mirror 33 changes the angle of the mirror to scan the laser beam in the direction parallel to the Y-axis. The scanning direction is not limited to the Y-axis direction, and scanning may be performed in the X-axis direction or in two axial directions of the X-axis and the Y-axis. Preferably, scanning is performed in a direction parallel to the longer-side direction of the first area 101, the second area 102, and the third area 103 from the viewpoint of efficient marking. In addition to the galvano mirror, for example, a polygon mirror, an acoustooptic element, and a micro-electromechanical system (MEMS) mirror may also be used.

The controller 40 according to the present embodiment can control each of the first marker 10, the second marker 20, and the third marker 30.

In FIG. 2, each of the first area 101, the second area 102, and the third area 103 is indicated by a bold arrow. As illustrated in FIG. 2, the positions of the multiple areas in the Z-axis direction vary depending on the curvature of the PET bottle 100 around the cylindrical axis. Compared with the first area 101 and the third area 103, the second area 102 is located closer to the marking device 1 in the Z-axis direction.

Accordingly, when each of the first marker 10, the second marker 20, and the third marker 30 concentrates the laser beam onto the same position in the Z-axis direction, the laser beam may spread on each area.

For example, the second marker 20 concentrate the second laser beam L2 at the same position as the focal point of the first laser beam L1 by the first marker 10 in the Z-axis direction. In such cases, the second area 102 is located ahead of the beam-waist position of the concentrated laser beam. Accordingly, the second area 102 is irradiated with the second laser beam L2 that is spread out. As a result, the degree of resolution of the pattern marked in the second area 102 decreases, and the quality of the marking deteriorates.

For this reason, in the present embodiment, the second condenser lens 22 is disposed to be shifted by the distance d in the +Z-direction, compared with the first condenser lens 12 and the third condenser lens 32. The distance d can be determined in advance based on the curvature of the curved plane 110.

Accordingly, the second marking plane 112 that is formed by the second condenser lens 22 is shifted in the +Z-direction by the distance d with respect to the first marking plane 111 that is formed by the first condenser lens 12 and the third marking plane 113 that is formed by the third condenser lens 32. As a result, the second laser beam L2 can be concentrated so as to become a beam waist on the second area 102.

In the present embodiment, the term marking plane refers to a plane on which a marker performs marking by changing the focal point of the laser beam. The focal point of the laser beam is changed as the laser beam is scanned or as the PET bottle is conveyed. The positions of the marking planes in the direction parallel to the Z-axis are equal to the focal points of the laser beams by the markers. Accordingly, the first marking plane 111 according to the present embodiment serves as the first focal point by the first condenser lens 12, and the second marking plane 112 according to the present embodiment serves as the second focal point by the second condenser lens 22. In FIG. 2, the multiple marking planes 111, 112, and 113 are indicated by broken lines.

The central axis 51 of the first condenser lens 12 is along the Z-axis. For this reason, in other words, the second marking plane 112 is different from the first marking plane 111 in the direction parallel to the central axis 51. The central axis 51 is, for example, the optical axis of the first condenser lens 12.

In the present embodiment, each of the first area 101, the second area 102, and the third area 103 is a curved surface, and there is a difference in height or a difference in position in the direction parallel to the central axis 51 in each of the areas. Accordingly, the first area 101, the second area 102, and the third area 103 do not match the marking planes 111, 112, and 113. As a result, the laser beam spreads in accordance with the height difference between each area in the direction parallel to the central axis 51 and each marking plane.

In the present embodiment, the position of each marker with respect to the PET bottle 100 in the direction parallel to the central axis 51 is determined such that the marking plane is disposed in the center of the height difference in each area. As a result, the spread of laser beam according to the height difference between each area and the corresponding marking plane in the direction parallel to the central axis 51 can be controlled.

As illustrated in FIG. 2, since the surfaces of the first area 101 and the third area 103 are inclined, the height difference in each area is relatively large. The first marking plane 111 and the second marking plane 112 are arranged in the center of the height difference in the first area 101 and the third area 103.

Figure 3:
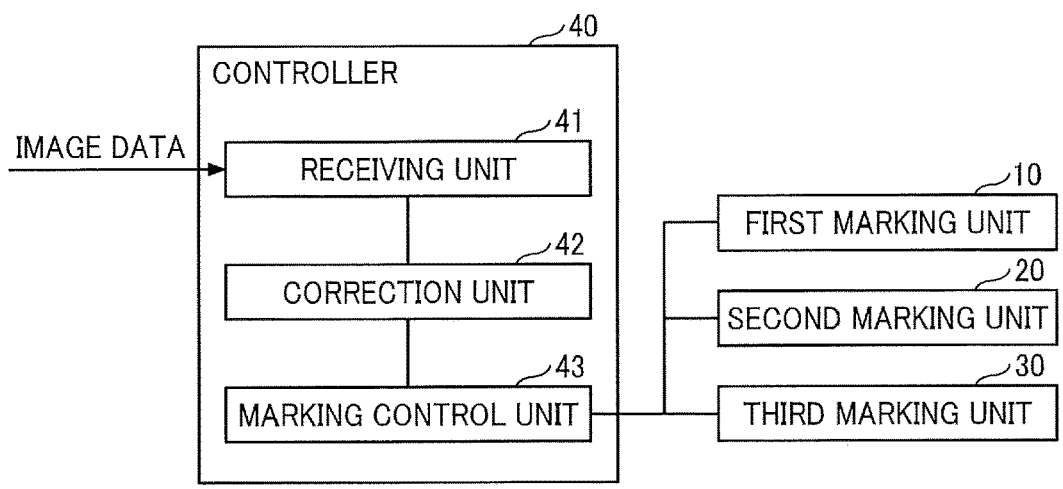
FIG. 3 is a block diagram of a functional configuration of a controller according to the first embodiment of the present disclosure.

FIG. 3 is a block diagram illustrating a functional configuration of the controller 40 included in the marking device 1, according to the present embodiment.

As illustrated in FIG. 3, the controller 40 according to the present embodiment includes a receiving unit 41, a correction unit 42, and a marking control unit 43. Such functional units of the controller 40 may be implemented by an electric circuit, or some of or all of the functional units of the controller 40 may be implemented by software or a central processing unit (CPU). Alternatively, the multiple functional units of the controller 40 may be implemented by a plurality of electric circuits or a plurality of software components.

The controller 40 receives image data from an external device such as a personal computer (PC) through the receiving unit 41, and causes the marking control unit 43 to control each marker to perform marking based on the image data corrected as desired by the correction unit 42.

In the present embodiment, the marking plane is disposed in the center of the height difference in the area. As a result, the spread of the laser beam can be minimized. However, in a region such as the first area 101 and the third area 103 where the degree of inclination of the surface is relatively large, the quality of the marking may deteriorate as the spread of the laser beam increases or the image to be marked is deformed and marked.

The correction unit 42 corrects the image data according to the shape of the curved plane 110 such as the inclination of the surface in the first area 101 and the third area 103. When an image is projected on an inclined surface, keystone distortion occurs depending on the degree of inclination. For this reason, for example, the correction unit 42 may correct the image data by applying reversed keystone distortion of the keystone distortion of the projected image to the image data so as to cancel the keystone distortion.

In the processes of applying keystone distortion to the image data, the line width in the image data is widened or shortened on a line-by-line basis. Accordingly, the processes of applying keystone distortion to the image data according to the present embodiment serves as correcting processes in which the size an image indicated by the image data is increased or reduced.

It is more preferable from the viewpoint of improving the quality of marking that the correction unit 42 corrects the image data so that the level of gradation of the joint between the first area 101 and the second area 102 does not change or changes gradually.

The marking control unit 43 according to the present embodiment turns on or turns off the light emission of each of the first laser beam source 11, the second laser beam source 21, and the third laser beam source 31, or controls the degree of intensity of light. Further, the marking control unit 43 starts or stops driving the first galvano mirror 13, the second galvano mirror 23, and the third galvano mirror 33.

As described above, the marking device 1 according to the present embodiment performs marking on the curved plane 110 of the PET bottle 100, which corresponds to the non-planar portion of a medium. The curved plane 110 includes a plurality of areas including the first area 101 and the second area 102. The marking device 1 includes a first marker 10 that performs marking by concentrating a first laser beam L1 or first light on the first area 101 by a first condenser lens 12 that serves as a first optical system, and a second marker 20 that performs marking by concentrating a second laser beam L2 or second light on the second area 102 by a second condenser lens 22 that serves as a second optical system.

In the direction parallel to the central axis 51 of the first condenser lens 12, the second marking plane or the second focal point by the second condenser lens 22 is different from the first marking plane or the first focal point by the first condenser lens 12.

Accordingly, even when the positions of the first area 101 and the second area 102 in the direction parallel to the central axis 51 of the first condenser lens 12 are different from each other, the first marker 10 can concentrate the first laser beam L1 onto the first area 101 and the second marker 20 can concentrate the second laser beam L2 onto the second area 102. As a result, the marking device 1 can perform marking on both the first area 101 and the second area 102 at high quality.

For example, in the related art, the marking condition is changed to two conditions of a large dot and a small dot in the same region. By contrast, in the present embodiment, the marking condition can be changed on a region-by-region basis, and the quality of marking can be improved.

In the present embodiment, the first area 101 includes a non-overlapping area that does not overlap with the second area 102, and the first marker 10 performs marking in parallel with the second marker 20. When marking is performed on an area where a plurality of markers overlap with each other, the productivity of marking may decrease. As the first area 101 includes the non-overlapping area, the first marker 10 and the second marker 20 can perform marking on the first area 101 and the second area 102, respectively, in parallel. Accordingly, the productivity of marking can be improved.

However, no limitation is intended thereby, and the first area 101 may overlap with the second area 102. Due to such overlapping, for example, the first marker 10 and the second marker 20 can perform marking on the same region under different conditions.

In the present embodiment, the controller 40 controls each of the first marker 10 and the second marker 20 based on image data. The controller 40 includes the correction unit 42 that corrects image data according to the shape of the curved plane 110. For example, the correction unit 42 corrects the image data by increasing or reducing the size of the image indicated by the image data.

As the curved plane 110 is curved, the curved plane 110 does not match the marking plane. For this reason, the quality of the marking may deteriorate as the laser beam spreads according to the height difference of the curved surface in the direction parallel to the central axis 51 of the first condenser lens 12 or as the image to be marked is deformed and marked.

As the correction unit 42 corrects the image data in accordance with the shape of the curved plane 110, for example, the keystone distortion of the image to be marked can be corrected, and the quality of the marking can be prevented from deteriorating.

In the present embodiment, the first marker 10 raster-scans the first laser beam L1 in the longer-side direction in the first area 101, and the second marker 20 raster-scans the second laser beam L2 in the longer-side direction in the second area 102. As a result, marking can be performed at high speed in the longer-side direction of each area, and marking productivity can be further improved.

However, each of the multiple markers is not limited to a unit that performs raster scanning with a laser beam.

Figure 4:
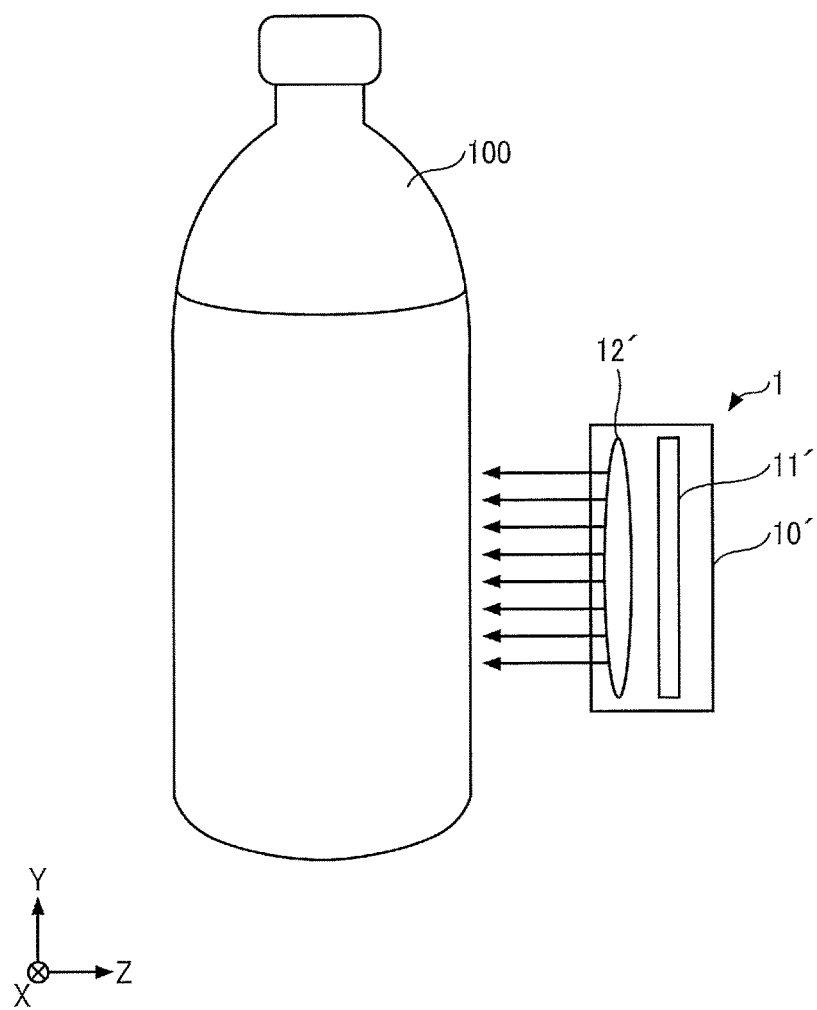
FIG. 4 is a diagram illustrating how a PET bottle is marked, according to an alternative embodiment of the present disclosure.

FIG. 4 is a diagram illustrating a configuration of a marker 10' as an alternative configuration of, for example, the marker 10, according to an alternative embodiment of the first embodiment of the present disclosure.

The marker 10' according to the present alternative embodiment of the first embodiment of the present disclosure is one of a plurality of markers provided for the marking device 1. As illustrated in FIG. 4, the marker 10' includes a laser array 11' and a condenser lens 12'.

The laser array 11' includes a plurality of laser beam sources arranged along the Y-axis, and emits a plurality of laser beams toward the PET bottle 100 in parallel from each one of the multiple laser beam sources. The condenser lens 12' according to the present alternative embodiment of the first embodiment of the present disclosure serves as the first optical system or the second optical system that concentrate each of the multiple laser beams emitted from the laser array 11' on the first area 101.

Even in such a configuration where each marker is provided with such a laser array 11', advantageous effects similar to the configuration in which raster scanning is performed with laser beams can be achieved.

In the present embodiment, the first condenser lens 12, the second condenser lens 22, and the third condenser lens 32 have the same focal length, and the position of the second condenser lens 22 is shifted from the first condenser lens 12 in the direction parallel to the central axis 51 of the first condenser lens 12. However, a unit or means for making the first marking plane 111 and the second marking plane 112 different from each other in the direction parallel to the central axis 51 is not limited thereto. For example, the second marking plane 112 may be different from the first marking plane 111 by shortening the focal length of the second condenser lens 22. Alternatively, the second marker 20 itself may be disposed so as to be shifted in the direction parallel to the central axis 51, to achieve advantageous effects similar to those in the above.

In the present embodiment, only the position of the second marking plane 112 is different from the other marking planes in the direction parallel to the central axis 51 of the first condenser lens 12. However, no limitation is indicated thereby. Depending on the arrangement of each one of the first area 101, the second area 102, and the third area 103, the positions of the first marking plane 111, the second marking plane 112, and the third marking plane 113 may be different from each other in the direction parallel to the central axis 51.

In the present embodiment, the marking device 1 is provided with three markers, and performs marking on the three areas included in the curved plane 110. However, no limitation is indicated thereby. The marking device 1 may be provided with more markers than three, and may perform marking on more areas included in the non-planar portion such as the curved plane 110.

In other words, the marking device 1 may include a plurality of markers including the first marker 10 and the second marker 20, and the focal points of the laser beams emitted from the multiple markers may be different from each other in the direction parallel to the central axis 51 of the first condenser lens.

The curved plane 110 according to the present embodiment serves as a non-planar portion. However, no limitation is intended thereby. The non-planar portion 110 may have bumps and dips or steps thereon, and each of the first area 101, the second area 102, and the third area 103 may also have bumps and dips or steps thereon. Even with such a configuration, similar advantageous effects can be achieved with the marking device 1 according to the above embodiments of the present disclosure.

Modification of First Embodiment

In the first embodiment of the present disclosure described with reference to FIG. 2, the widths of the first area 101, the second area 102, and the third area 103 in the circumferential direction of the PET bottle 100 are approximately equal to each other. However, when the height difference in the direction parallel to the central axis 51 of the first condenser lens 12 increases due to, for example, an increase in the degree of inclination in each area, the spread of the laser beam may increase depending on the height difference.

In order to handle such a situation, the widths of the first area 101, the second area 102, and the third area 103 in the circumferential direction can be made different from each other depending on the maximum height difference in each one of the first area 101, the second area 102, and the third area 103 in the direction parallel to the central axis 51 of the first condenser lens 12.

Figure 5:
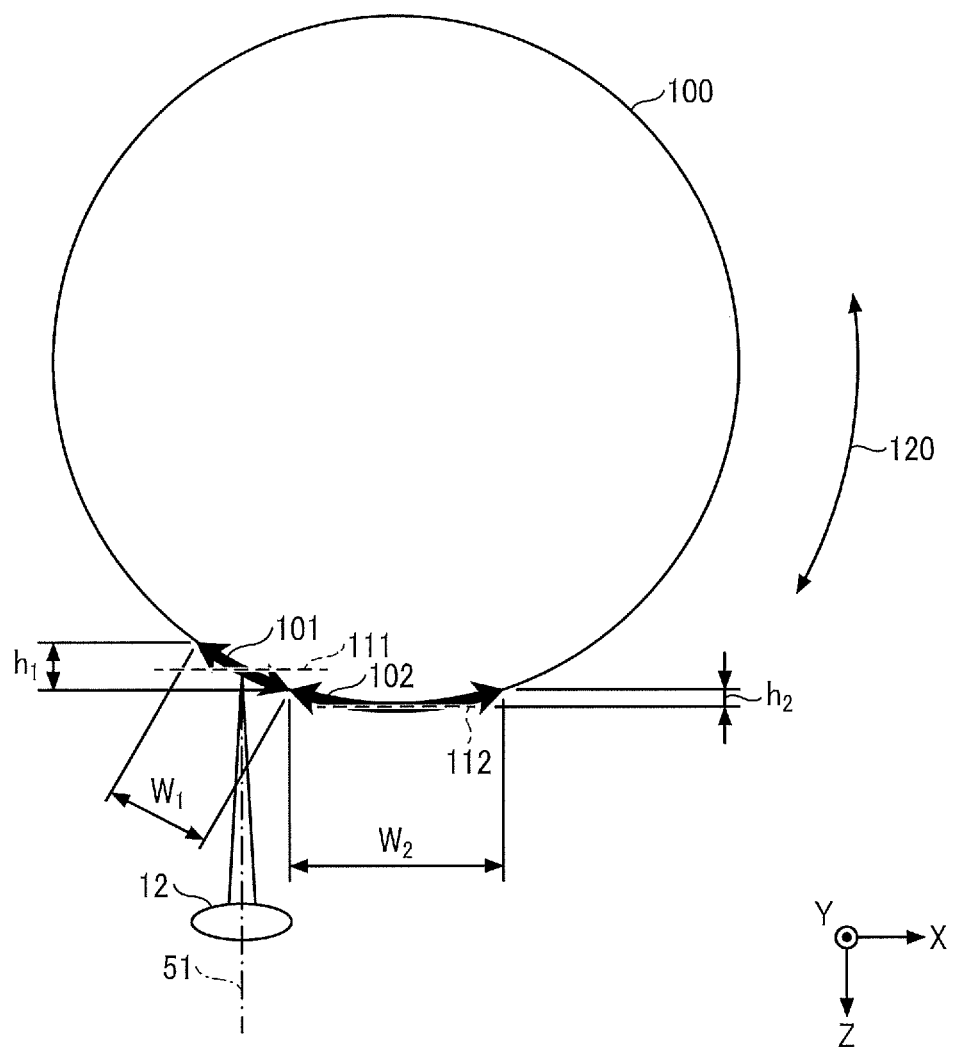
FIG. 5 is a diagram illustrating a difference in width of a plurality of areas in the circumferential direction of a PET bottle, according to an embodiment of the present disclosure.

FIG. 5 is a diagram illustrating a difference in width between the first area 101 and the second area 102 in the circumferential direction of the PET bottle 100, according to an embodiment of the present disclosure.

A circumferential direction 120 of the PET bottle 100 according to the present embodiment, as illustrated in FIG. 5, serves as a curvature direction of the non-planar portion.

As illustrated in FIG. 5, the maximum height difference $h_1$ in the first area 101 is greater than the maximum height difference $h_2$ in the second area 102 in the direction parallel to the central axis 51 of the first condenser lens 12. A width $W_1$ of the first area 101 in the circumferential direction 120 is smaller than a width $W_2$ of the second area 102 in the circumferential direction 120.

The maximum height difference $h_1$ becomes smaller as the width $W_1$ becomes smaller. Accordingly, the spread of the first laser beam L1 according to the height difference can be controlled, and the quality of marking on the first area 101 can be increased.

Only the first area 101 and the second area 102 are illustrated in FIG. 5. However, no limitation is indicated thereby. When the non-planar portion includes a plurality of areas including the first area 101 and the second area 102, the width of each area in the curvature direction can be made smaller as the maximum height difference in each one of the multiple areas is greater in the direction parallel to the central axis 51 of the first condenser lens 12. With such a configuration, advantageous effects similar to those in the embodiment described with reference to FIG. 5 can be achieved.

Second Embodiment

A marking device 1a according to a second embodiment of the present disclosure is described below. In view of the first embodiment of the present disclosure as described above, like reference signs denote like elements, and redundant description may be omitted where appropriate. The same applies to the embodiments of the present disclosure and the modifications thereof as will be described below.

Figure 6:
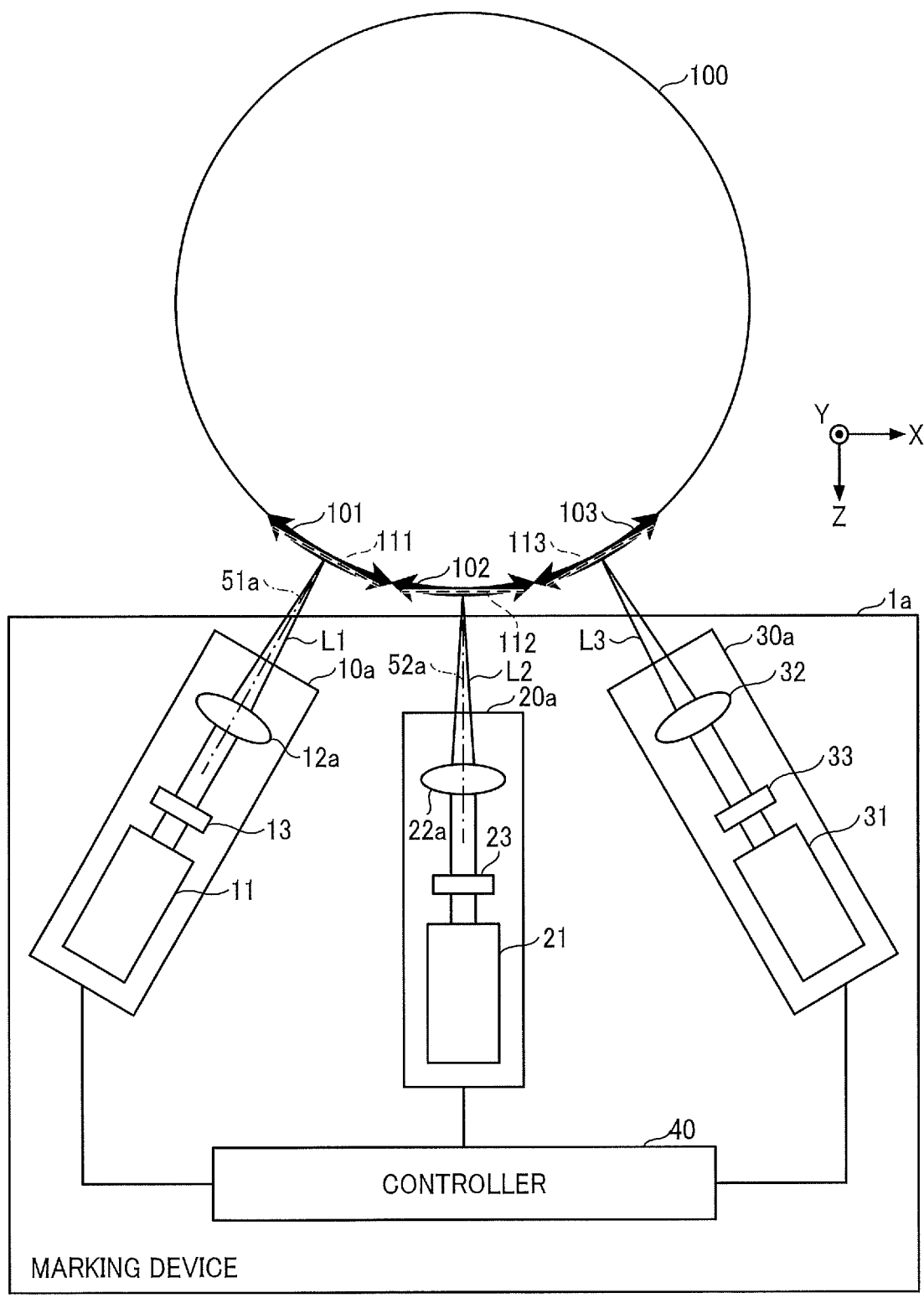
FIG. 6 is a diagram illustrating a configuration of a marking device according to a second embodiment of the present disclosure.

FIG. 6 is a diagram illustrating a configuration of the marking device 1a according to the second embodiment of the present disclosure.

As illustrated in FIG. 6, the marking device 1a includes a first marker group 10a, a second marker group 20a, and a third marker group 30a.

The first marker 10a is provided with a first condenser lens 12a, and the second marker 20a is provided with a second condenser lens 22a. The central axis 51 of the first condenser lens 12 is perpendicular to the plane of the first region 101. The central axis 52 of the second condenser lens is perpendicular to the plane of the second area 102, and is not parallel to the central axis 51 of the first condenser lens 12.

Orthogonality is not limited to being strictly vertical, and angular differences of ±5 degrees or less are allowed. This is applicable to the following description in which the term orthogonal is used.

With the configuration or structure of the marking device 1a described with reference to FIG. 6, the first condenser lens 12 can concentrate the first laser beam L1 such that the central axis 51a will be orthogonal to the plane of the first area 101, and the second condenser lens 22 can concentrate the second laser beam L2 such that the central axis 52 will be orthogonal to the plane of the second area 102. As a result, both the first area 101 and the second area 102 can be marked at high quality. The other aspects of the present embodiment are similar to those of the first embodiment of the present disclosure as described above.

Preferably, the first condenser lens 12 concentrates the first laser beams L1 such that the central axis 51 of the first condenser lens 12 is orthogonal to the surface of the first area 101 approximately in the center of the first area 101 in the circumferential direction of the PET bottle 100.

Preferably, the second condenser lens 22 concentrates the second laser beams L2 such that the central axis 52 of the second condenser lens 22 is orthogonal to the surface of the second area 102 approximately in the center of the second area 102 in the circumferential direction of the PET bottle 100.

Third Embodiment

A marking device 1b according to a third embodiment of the present disclosure is described below.

Figure 7:
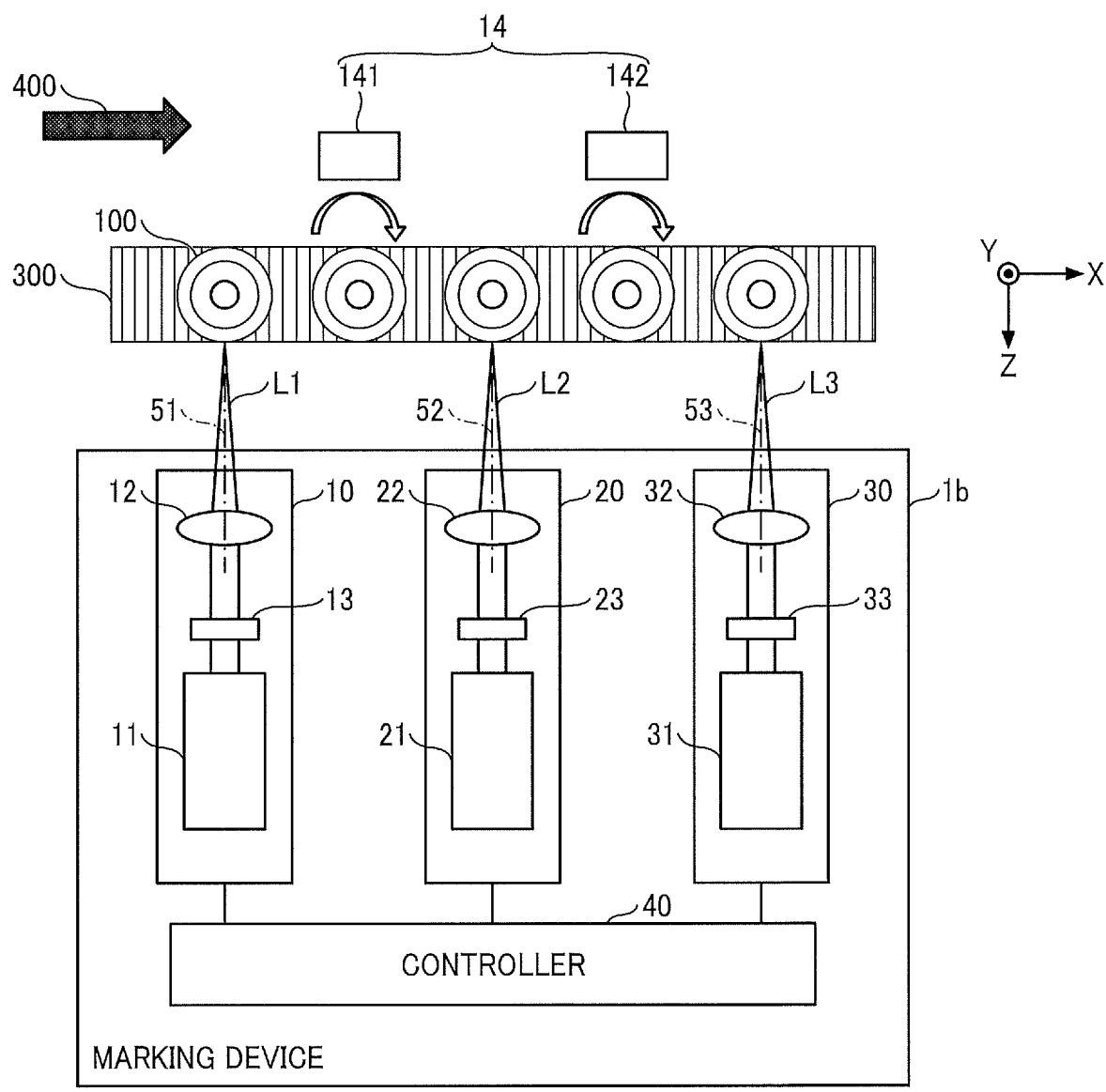
FIG. 7 is a diagram illustrating a configuration of a marking device according to a third embodiment of the present disclosure.

FIG. 7 is a diagram illustrating a configuration of the marking device 1b according to the third embodiment of the present disclosure.

In FIG. 7, the PET bottle 100 is placed on the conveyor 300, and is conveyed in the conveyance direction 400.

As illustrated in FIG. 7, the marking device 1b is provided with a manipulator 14. All of the five PET bottles that are illustrated in FIG. 7 represent the same PET bottle 100. In other words, a plurality of PET bottles are illustrated in FIG. 7, and each of these PET bottles are at different positions in the conveyance direction 400 depending on the time as the PET bottle 100 is conveyed.

The manipulator 14 includes a first manipulator 141 and a second manipulator 142. The first manipulator 141 is provided between the first marker 10 and the second marker 20 along the conveyance direction 400, and changes the orientation of the non-planar portion included in the PET bottle 100.

The second manipulator 142 is provided between the second marker 20 and the third marker 30 along the conveyance direction 400, and changes the orientation of the non-planar portion included in the PET bottle 100. Each of the first manipulator 141 and the second manipulator 142 according to the present embodiment serves as an adjuster. However, the adjuster is not limited to the manipulator 14, and may be any means as long as the functionality of the adjuster can be implemented.

The PET bottle 100 is conveyed in the conveyance direction 400 by the conveyor 300 and is temporarily stopped at a position where the first area 101 faces the first marker 10 along the central axis 51 of the first condenser lens 12. After that, the first marker 10 performs marking on the first area 101.

Subsequently, the PET bottle 100 is conveyed in the conveyance direction 400 by the conveyor 300 and is temporarily stopped at a position facing the first manipulator 141.

The first manipulator 141 grips and lifts the temporarily stopped PET bottle 100, and rotates the PET bottle 100 around the cylindrical axis thereof. In so doing, the first manipulator 141 changes the orientation of the curved plane 110 so that the plane of the second area 102 will be orthogonal to the central axis 52 of the second condenser lens 22. The amount of change in orientation can be determined in advance.

After the orientation of the curved plane 110 is changed, the first manipulator 141 places the PET bottle 100 on the conveyor 300.

Subsequently, the PET bottle 100 is conveyed in the conveyance direction 400 by the conveyor 300 and is temporarily stopped at a position where the second area 102 faces the second marker 20 along the central axis 52 of the second condenser lens 22. After that, the second marker 20 performs marking on the second area 102.

Subsequently, the PET bottle 100 is conveyed in the conveyance direction 400 by the conveyor 300 and is temporarily stopped at a position facing the second manipulator 142.

The second manipulator 142 grips and lifts the temporarily stopped PET bottle 100, and rotates the PET bottle 100 around the cylindrical axis thereof. In so doing, the second manipulator 142 changes the orientation of the curved plane 110 so that the plane of the third area 103 is orthogonal to the central axis 53 of the second condenser lens 22. After the orientation of the curved surface portion 110 is changed, the second manipulator 142 places the PET bottle 100 on the conveyor 300.

Subsequently, the PET bottle 100 is conveyed in the conveyance direction 400 by the conveyor 300 and is temporarily stopped at a position where the third area 103 faces the third marker 30 along the central axis 53 of the third condenser lens 32. After that, the third marker 30 performs marking on the third area 103.

FIG. 8A and FIG. 8B are diagrams each illustrating how the PET bottle 100 is marked by a marking device 1b, according to the third embodiment of the present disclosure.

In FIG. 8A, the PET bottle 100 is conveyed in the conveyance direction 400 by the conveyor 300 and is temporarily stopped at a position where the first area 101 faces the first marker 10 along the central axis 51 of the first condenser lens 12.

As illustrated in FIG. 8A, the central axis 51 of the first condenser lens 12 is orthogonal to the plane of the first area 101. In this state, the first marker 10 performs marking on the first area 101.

Preferably, the first manipulator 141 changes the orientation of the curved plane 110 such that the central axis 51 of the first condenser lens 12 is orthogonal to the surface of the first area 101 approximately in the center of the first area 101 in the circumferential direction of the PET bottle 100.

In FIG. 8B, the PET bottle 100 is conveyed in the conveyance direction 400 by the conveyor 300 and is temporarily stopped at a position where the second area 102 faces the second marker 20 along the central axis 52 of the second condenser lens 22.

As illustrated in FIG. 8B, the central axis 52 of the second condenser lens 22 is orthogonal to the plane of the second area 102. In this state, the second marker 20 performs marking on the second area 102.

Preferably, the first manipulator 142 changes the orientation of the curved plane 110 such that the central axis 52 of the second condenser lens 22 is orthogonal to the surface of the second area 102 approximately in the center of the second area 102 in the circumferential direction of the PET bottle 100.

As described above, in the present embodiment, after the first marker 10 has performed marking on the first area 101 and the manipulator 14 that serves as a plurality of adjusters has changed the direction of the curved plane 110 that serves as a non-planar portion, the second marker 20 performs marking on the second area 102.

Accordingly, the first condenser lens 12 can concentrate the first laser beam L1 such that the central axis 51 will be orthogonal to the plane of the first area 101, and the second condenser lens 22 can concentrate the second laser beam L2 such that the central axis 52 will be orthogonal to the plane of the second area 102. As a result, both the first area 101 and the second area 102 can be marked at high quality. The other aspects of the present embodiment are similar to those of the first embodiment of the present disclosure as described above.

Fourth Embodiment

A marking device 1c according to a fourth embodiment of the present disclosure is described below.

Figure 9:
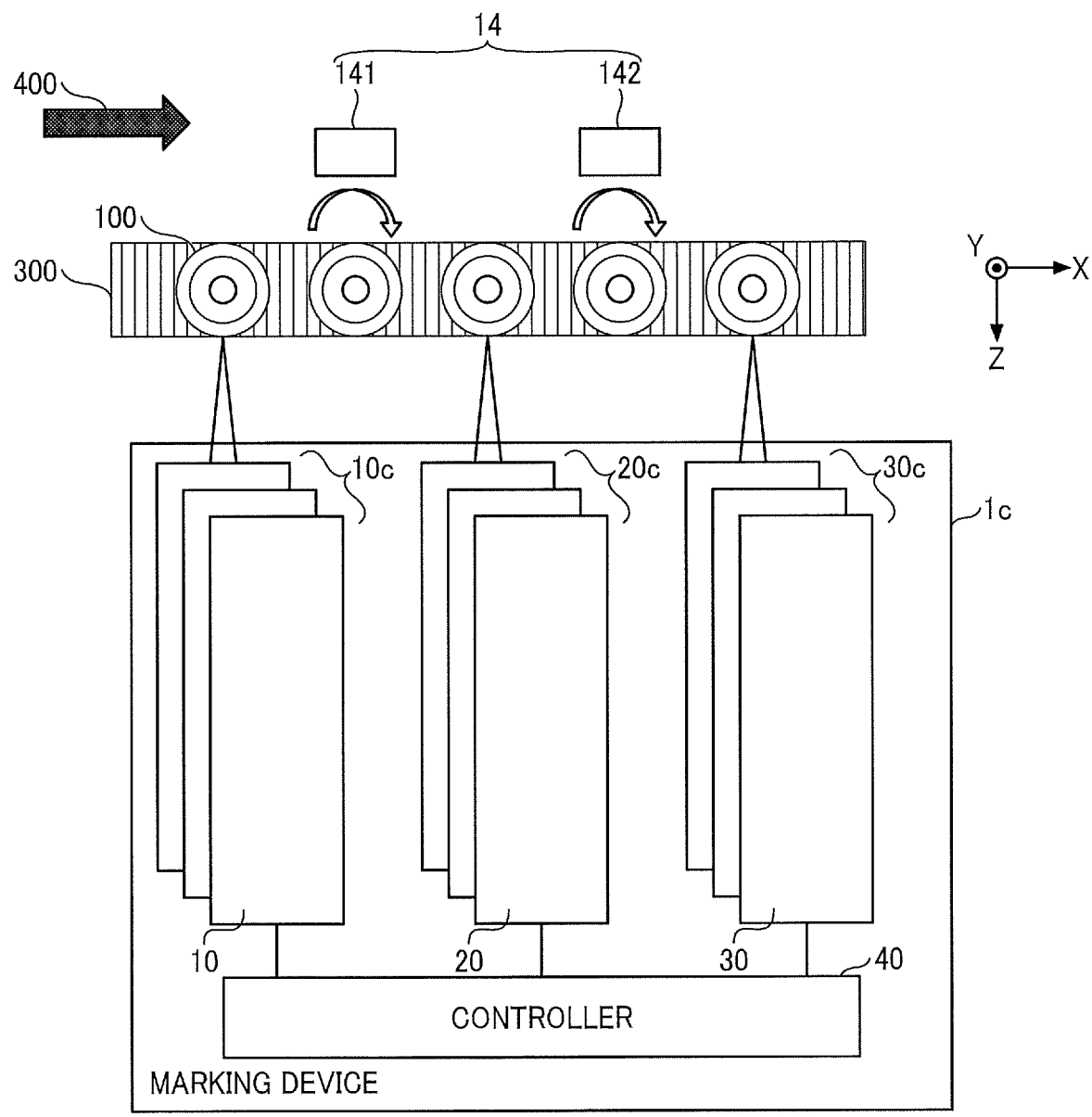
FIG. 9 is a diagram illustrating a configuration of a marking device according to a fourth embodiment of the present disclosure.

FIG. 9 is a diagram illustrating a configuration of the marking device 1c according to the fourth embodiment of the present disclosure.

As illustrated in FIG. 9, the marking device 1c includes a first marker group 10c, a second marker group 20c, and a third marker group 30c.

The first marker group 10c includes three first markers 10 stacked in the stacking direction parallel to the Y-axis. The second marker group 20c includes three second markers 20 stacked in the stacking direction. The third marker group 30c includes three third markers 30 stacked in the stacking direction.

As described above, a plurality of markers are stacked on top of each other in the stacking direction parallel to the cylindrical axis of the PET bottle 100. As a result, marking can be performed in parallel in a wide range in the stacking direction of the PET bottle 100. Accordingly, the productivity of marking can further be improved.

The number of stacked markers can be changed for each of the marker groups.

Figure 10:
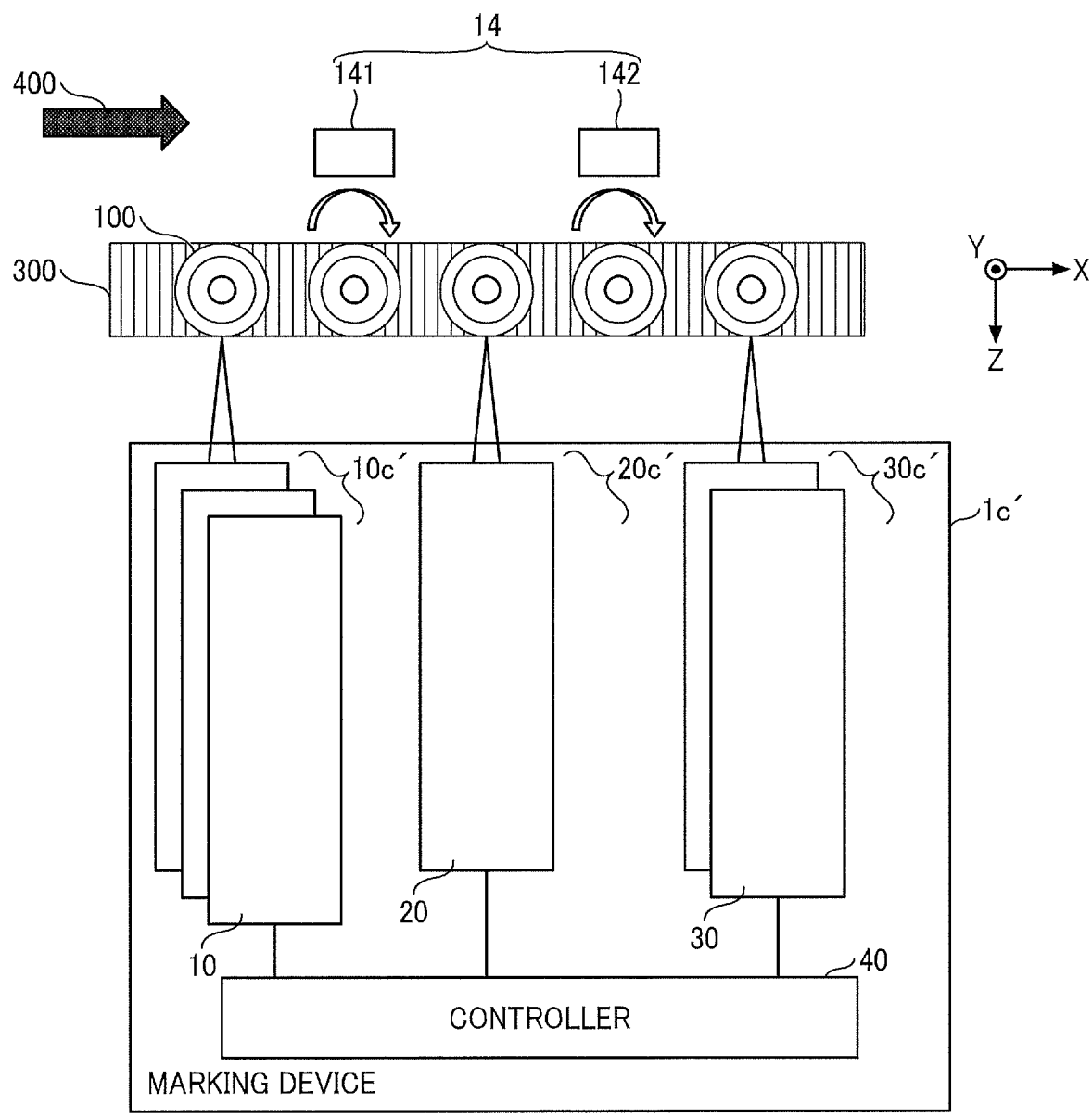
FIG. 10 is a diagram illustrating an alternative configuration of a marking device according to the fourth embodiment of the present disclosure.

FIG. 10 is a diagram illustrating a configuration of a marking device 1c' as an alternative configuration of, for example, the marking device 1c, according to an alternative embodiment of the fourth embodiment of the present disclosure.

As illustrated in FIG. 10, the marking device 1c' includes a first marker group 10c', a second marker group 20c', and a third marker group 30c'.

The first marker group 10c' includes three first markers 10 stacked in the direction parallel to the Y-axis. The second marker group 20c' includes one second marker 20. The third marker group 30c' includes two third markers 30 stacked in the direction parallel to the Y-axis.

The number of stacked markers may be limited due to, for example, the restrictions on the installation location of the marking device 1c'. However, it is possible to handle, for example, the restrictions on the installation location of the marking device 1c' by changing the number of stacked markers for each of the multiple marker groups. The other aspects of the present embodiment are similar to those of the first embodiment of the present disclosure as described above. The configuration, structure, or functions of the fourth embodiment of the present disclosure can be combined with those of any one of the first to third embodiments of the present disclosure.

OTHER EMBODIMENTS

In each of the embodiments described above, the PET bottle 100 that is in cylindrical shape is illustrated. However, the medium on which marking is performed by the marking device according to each one of the multiple embodiments of the present disclosure is not limited to a cylindrical medium. For example, the marking device according to the embodiments of the present disclosure can perform marking on a cylindrical or tubular member such as a PET bottle whose cross section is in a polygonal shape.

Figure 11:
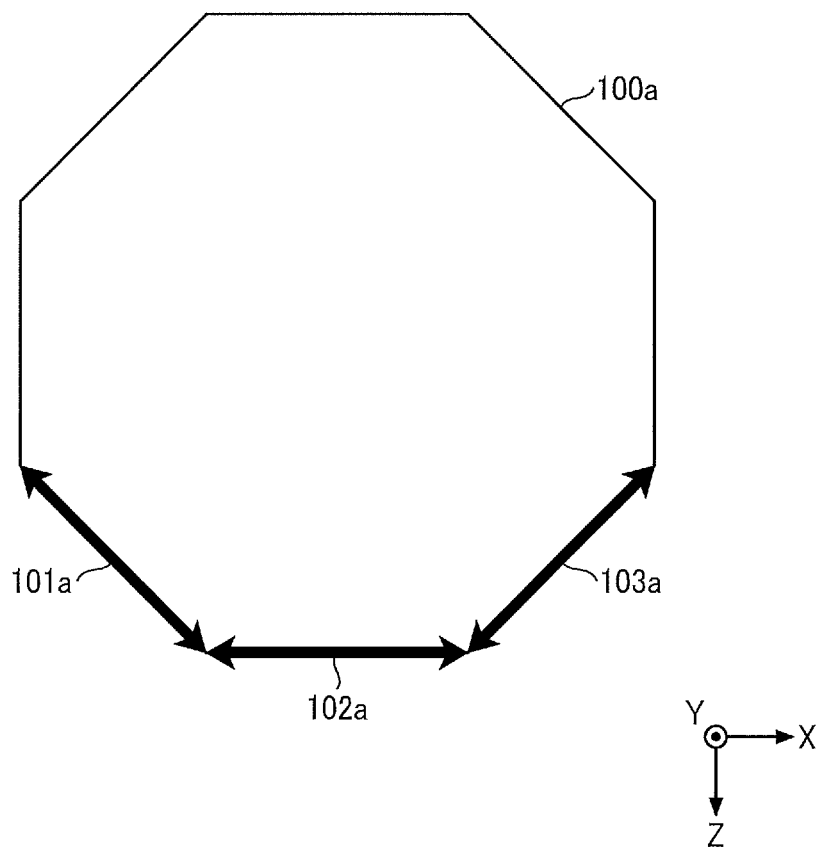
FIG. 11 is a diagram illustrating how a polygonally tubular PET bottle is marked, according to an embodiment of the present disclosure.

FIG. 11 is a diagram illustrating how a PET bottle 100a whose cross section is in a polygonal shape is marked, according to an alternative embodiment of the present disclosure.

In FIG. 11, the PET bottle 100a whose cross section is in a polygonal shape is illustrated in the axial direction of the cylinder. As illustrated in FIG. 11, some of the sides of polygonal cross section of the PET bottle 100a may be referred to as a first area 101a, a second area 102a, and a third area 103a.

FIG. 12 is a diagram illustrating a container according to an alternative embodiments of the present disclosure.

As illustrated in FIG. 12, the container 7 includes the PET bottle 100, the to-be-contained object 9 contained inside the PET bottle 100, and a cap 8. On at least one side of the PET bottle 100, a pattern 201 that includes characters "labelless" is marked. Note that the cap 8 is not an essential element of the container 7.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Embodiments of the present disclosure includes a marking method. For example, a marking method is implemented by a marking device that performs marking on a non-planar portion of a medium, and the non-planar portion has a plurality of areas including a first area and a second area.

The marking method includes a step of concentrating a first light onto a first area of the non-planar portion of the medium to perform the marking on the first area, and a step of concentrate a second light onto the second area with a second optical system having a second focal point, to perform the marking on the second area. The second focal point of the second optical system is different from the first focal point of the first optical system in a direction parallel to a central axis of the first optical system. With to such a marking method, advantageous effects similar to those obtained by the marking device according to the above embodiments of the present disclosure can be achieved.

The numbers such as ordinal numbers and numerals that indicates quantity are all given by way of example to describe the technologies to implement the embodiments of the present disclosure, and no limitation is indicated to the numbers given in the above description. The description as to how the elements are related to each other, coupled to each other, or connected to each other are given by way of example to describe the technologies to implement the embodiments of the present disclosure, and how the elements are related to each other, coupled to each other, or connected to each other to implement the functionality in the present disclosure is not limited thereby.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. The processing circuit herein includes, for example, devices such as a processor that is programmed to execute software to implement functions, like a processor with electronic circuits, an application specific integrated circuit (ASIC) that is designed to execute the above functions, a digital signal processor (DSP), a field-programmable gate array (FPGA), and a circuit module known in the art.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A marking device comprising:
a first marker including a first optical system having a first focal point, the first marker being configured to concentrate a first light onto a first area of a non-planar portion of a medium to perform marking on the first area, the non-planar portion including a plurality of areas including the first area and a second area,
a second marker including a second optical system having a second focal point, the second marker being configured to concentrate a second light onto the second area to perform the marking on the second area, the second focal point of the second optical system being different from the first focal point of the first optical system in a direction parallel to a central axis of the first optical system; and
a controller configured to:
receive image data including control conditions for the first and second markers,
correct the received image data to compensate for trapezoidal distortion of a projected image based on a shape of the non-planar portion, and
control each of the first marker and the second marker based on the corrected image data to form a predetermined image on the medium.

2. The marking device according to claim 1,
wherein the non-planar portion has a curvature in a curvature direction, and
wherein as a maximum height difference in each one of the plurality of areas is larger in the direction parallel to the central axis of the first optical system, a width of each one of the plurality of areas in the curvature direction is smaller.

3. The marking device according to claim 1, further comprising
a plurality of markers including the first marker and the second marker,
wherein focal points of laser beams emitted from the plurality of markers are different from each other in the direction parallel to the central axis of the first optical system.

4. A marking device comprising:
a first marker including a first optical system having a first central axis, the first marker being configured to concentrate a first light onto a first area of a non-planar portion of a medium to perform marking on the first area, the non-planar portion including a plurality of areas including the first area and a second area; and
a second marker including a second optical system having a second central axis, the second marker being configured to concentrate a second light onto the second area to perform the marking on the second area,
wherein the first central axis of the first optical system is orthogonal to a plane intersecting with the first area,
wherein the second central axis of the second optical system is orthogonal to a plane tangent to the second area and is not parallel to the first central axis of the first optical system, and wherein the device further comprises a controller configured to:
receive image data including control conditions for the first and second markers,
correct the received image data to compensate for trapezoidal distortion of a projected image based on a shape of the non-planar portion, and
control each of the first marker and the second marker based on the corrected image data to form a predetermined image on the medium.

5. A marking device comprising:
a first marker having a first optical system, the first marker being configured to concentrate a first light onto a first area of a non-planar portion of a medium to perform marking on the first area, the non-planar portion including a plurality of areas including the first area and a second area, the medium being conveyed in a conveyance direction;
a second marker having a second optical system, the second marker being configured to concentrate a second light onto the second area to perform the marking on the second area; and
an adjuster disposed between the first marker and the second marker in the conveyance direction, the adjuster being configured to change a direction of the non-planar portion, wherein the second marker is configured to perform the marking on the second area after the first marker performs the marking on the first area and the adjuster changes the direction of the non-planar portion, and wherein the device further comprises a controller configured to:

receive image data including control conditions for the first and second markers, correct the received image data to compensate for trapezoidal distortion of a projected image based on a shape of the non-planar portion, and control each of the first marker and the second marker based on the corrected image data to form a predetermined image on the medium.

6. The marking device according to claim 1,
wherein the first area includes a non-overlapping area that does not overlap with the second area.

7. The marking device according to claim 1,
wherein the first marker is configured to perform the marking in parallel with the second marker.

8. The marking device according to claim 1,
wherein the first area overlaps with the second area.

9. The marking device according to claim 1,
wherein the controller is configured to increase or reduce a size of an image indicated by the image data to correct the image data.

10. The marking device according to claim 1,
wherein the controller is configured to correct the image data so that a level of gradation of a joint between the first area and the second area does not change or gradually changes.

11. The marking device according to claim 1,
wherein the first marker is configured to perform raster scanning with the first light in a longer-side direction of the first area, and
wherein the second marker is configured to perform raster scanning with the second light in a longer-side direction of the second area.

12. The marking device according to claim 1,
wherein at least one of the first marker or the second marker includes a plurality of laser beam sources, and
wherein the at least one of the first marker or the second marker is configured to concentrate a laser beam emitted from each of the plurality of laser beam sources to perform the marking.

13. The marking device according to claim 1, further comprising:
a plurality of first markers including the first marker;
a first marker group in which the plurality of first markers are stacked on top of each other in a prescribed stacking direction; and
a plurality of second markers including the second marker; and
a second marker group in which the plurality of second markers are stacked on top of each other in the prescribed stacking direction.

14. A medium comprising
the non-planar portion marked by the marking device according to claim 1.

15. A container comprising:
the medium according to claim 14; and
a to-be-contained object stored in the medium.

* * * * *